United States Patent [19]

Spani

[11] 3,768,897

[45] Oct. 30, 1973

[54] POSITIVE-NEGATIVE MICROFILM FILM READER

[75] Inventor: Wayne Spani, San Diego, Calif.

[73] Assignee: Eastman Kodak Company, Rochester, N.Y.

[22] Filed: July 28, 1971

[21] Appl. No.: 166,917

[52] U.S. Cl. .................................. 353/26, 353/120

[51] Int. Cl. .......................................... G03b 23/12

[58] Field of Search ................. 353/25, 26, 27, 120; 235/61.11 E, 61.11 D; 340/172.5

[56] References Cited

UNITED STATES PATENTS

| | | | |
|---|---|---|---|
| 3,290,987 | 12/1966 | James et al. | 353/26 |
| 2,933,245 | 4/1960 | Fitch et al. | 235/61.11 E |
| 3,596,253 | 7/1971 | Ruth | 340/172.5 |

*Primary Examiner*—Harry N. Haroian
*Attorney*—W. H. J. Kline et al.

[57] ABSTRACT

Apparatus is disclosed for retrieving a particular microfilm document image from a plurality of document images recorded on a strip of film which may have positive and negative portions with each such portion having a plurality of document images and an identifying code field for each document image. The apparatus includes polarity indication means which determines whether a film portion is positive or negative and produces a control signal indicative of the polarity thereof and a code field decoder responsive to the control signal for decoding recorded code fields, whether recorded on positive or negative film portions, to retrieve the particular document image.

5 Claims, 6 Drawing Figures

Patented Oct. 30, 1973 3,768,897

6 Sheets-Sheet 1

WAYNE SPANI
INVENTOR.

BY Raymond L. Owens
W. H. J. Kline
ATTORNEYS

WAYNE SPANI
INVENTOR.
BY Raymond L. Owens
W. H. J. Kline
ATTORNEY

WAYNE SPANI
INVENTOR.

BY Raymond L. Owens
W. H. J. Kline
ATTORNEYS

WAYNE SPANI
INVENTOR.

BY Raymond L. Owens
W. H. J. Kline
ATTORNEYS

WAYNE SPANI
INVENTOR.
BY Raymond L. Owens
W. H. J. Kline
ATTORNEYS

WAYNE SPANI
INVENTOR.

BY Raymond L. Owens
W. H. J. Kline
ATTORNEYS

POSITIVE-NEGATIVE MICROFILM FILM READER

FIELD OF THE INVENTION

The present invention relates to automatic information searching apparatus for retrieving information recorded on a medium such as film, and more particularly, to microfilm reader apparatus for retrieving a particular microfilm image from a plurality of images.

DESCRIPTION OF THE PRIOR ART

In microfilm information storage and retrieval systems, reduced information images are recorded on film such as 16mm film. The reduction of the size of document images provides a substantial reduction in document storage volume and simplifies mass handling of documents. Since literally thousands of document images may be stored on a reel of film, hand searching of these images for document retrieval would be extremely time-consuming. Accordingly, automatic searching techniques have been developed which use film coding arrangements wherein a document image is accompanied by a code field which usually represents a number. An automatic microfilm reader may be arranged to scan and decode the code fields to locate code fields of documents to be retrieved. After locating a predetermined code field the reader moves the identified document image to a projection station where the document image is projected onto a viewing screen.

In one system, the code field is in the form of opaque and transparent rectangular areas which are disposed adjacent to and identify a document image. The code field comprises a plurality of columns of bits of digital data with each column of data called a column word. For example, in commonly assigned U.S. Pat. No. 3,290,987 to James et al., there is disclosed a system wherein a code field of data includes a plurality of column words recorded on microfilm to identify a document image immediately preceding (or following) the code field. Adjacent to each column word there is a position image mark or indicium called a timing mark (TM) and adjacent to each document image is a position image mark or indicium called a document mark (DM). A user enters a document identifying code field which can be one or more column words into a memory storage unit of a microfilm reader. Thereafter the reader, in a search mode, rapidly scans a reel of microfilm and after recognizing a timing mark, decodes a column word and compares it with the column words in memory. After a code field is read, a determination is made whether the code field in memory is present on the film. If it is, a signal called a hit signal is produced. In response to the hit signal, means are activated for stopping the film. However because of the speed at which the search of film is being undertaken, the film will actually be advanced a considerable length past the reader station after a hit signal is produced before the film is stopped. The direction of the film is then reversed and the film moved backward until the identified document image is stopped in a projection station where it may be enlarged and projected upon a viewer screen or reproduced by a copier. More specifically, after a hit signal is produced, a counter is enabled which accumulates a count equal to the number of document marks which have been advanced past the reader station. With the film moving in the reverse direction the counter is counted down with each passing document mark until a zero count is reached, at which time the film is stopped and the identified document image positioned in the projection station.

It is desirable that such microfilm systems be adapted to search composite positive and negative films. In U. S. Pat. No. 2,933,245 to Finch et al there is disclosed a positive-negative film detecting system which uses a relay which in response to a fil type mark selects either a first or a second code translation network to be connected to code reading photosensitive devices.

SUMMARY OF THE INVENTION

In the disclosed embodiment of the invention microfilm reading apparatus is disclosed for retrieving a particular document or information image from film having positive and/or negative portions. An identifying code field is provided for each image and a timing mark is provided for each code field. The apparatus includes first and second photosensitive devices disposed in a reader station for producing signals having a first predetermined code pattern in response to a positive film timing mark moving past the devices and a second predetermined code pattern in response to a negative film timing mark moving past the devices. The apparatus further includes a shift register coupled to the photosensitive devices for storing the code patterns and polarity indicating means coupled to the shift register and respectively responsive to the first and second code patterns to indicate the polarity of the film portion in the reader station. More specifically the film polarity indicating means make a film polarity determination for each timing mark and produce a control signal indicative of the film polarity. The apparatus further includes inversion control circuitry which in response to the control signal maintains a predetermined phase for the decoded code field signals before they are processed through the reader apparatus.

BRIEF DESCRIPTION OF THE DRAWINGS

The above and other objects and advantages of the present invention will become apparent from the following detailed description taken in conjunction with the attached drawings wherein.

Figure 1:
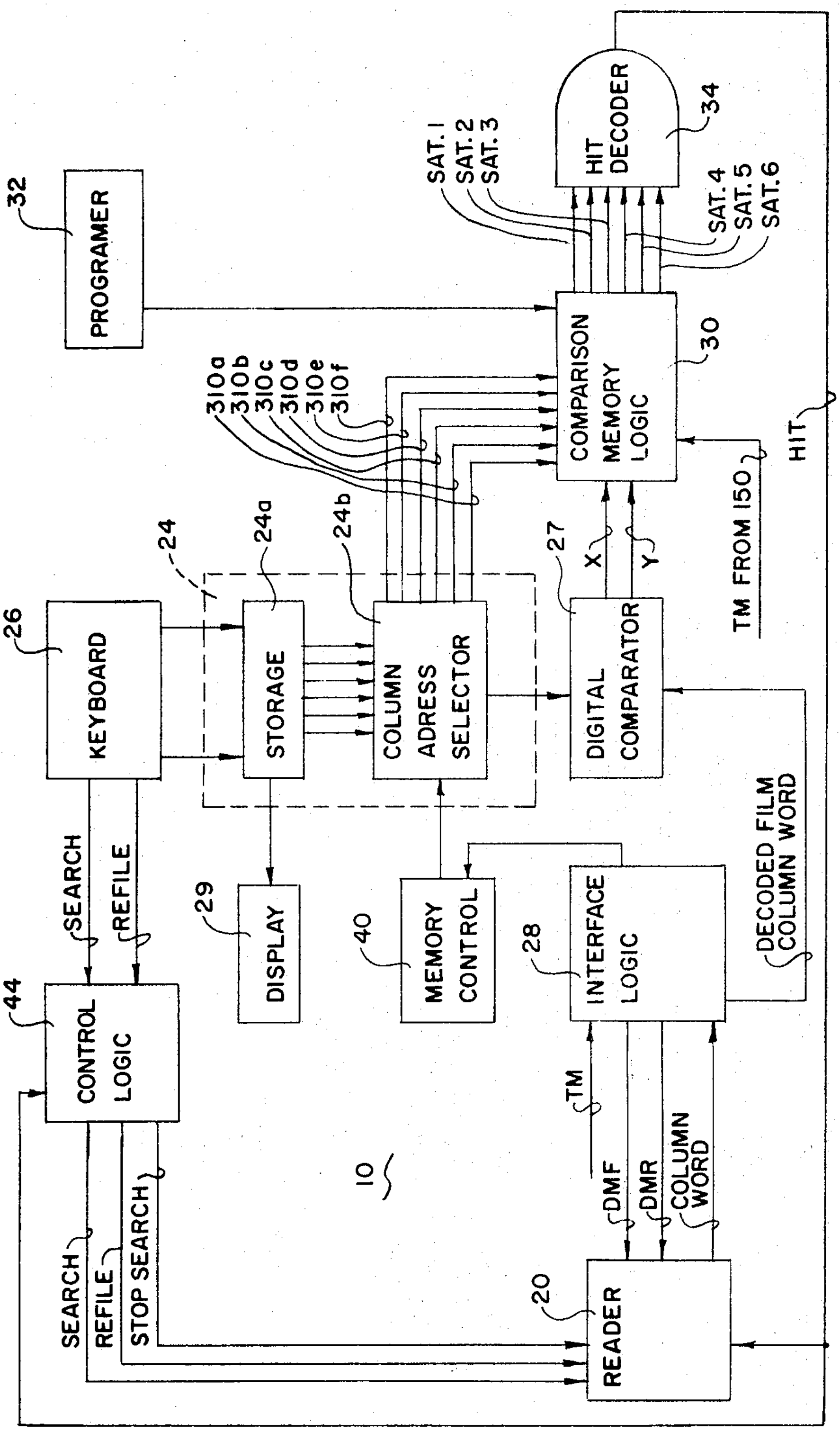
FIG. 1 is a block diagram showing the general arrangement of an automatic microfilm document reader system in accordance with the present invention.

The symbols for the logic components shown in the drawings are in accordance with American Standard Graphical Symbols for Logical Diagrams (ASA & 32. 14–1962).

DESCRIPTION OF THE PREFERRED EMBODIMENT

Figure 3:
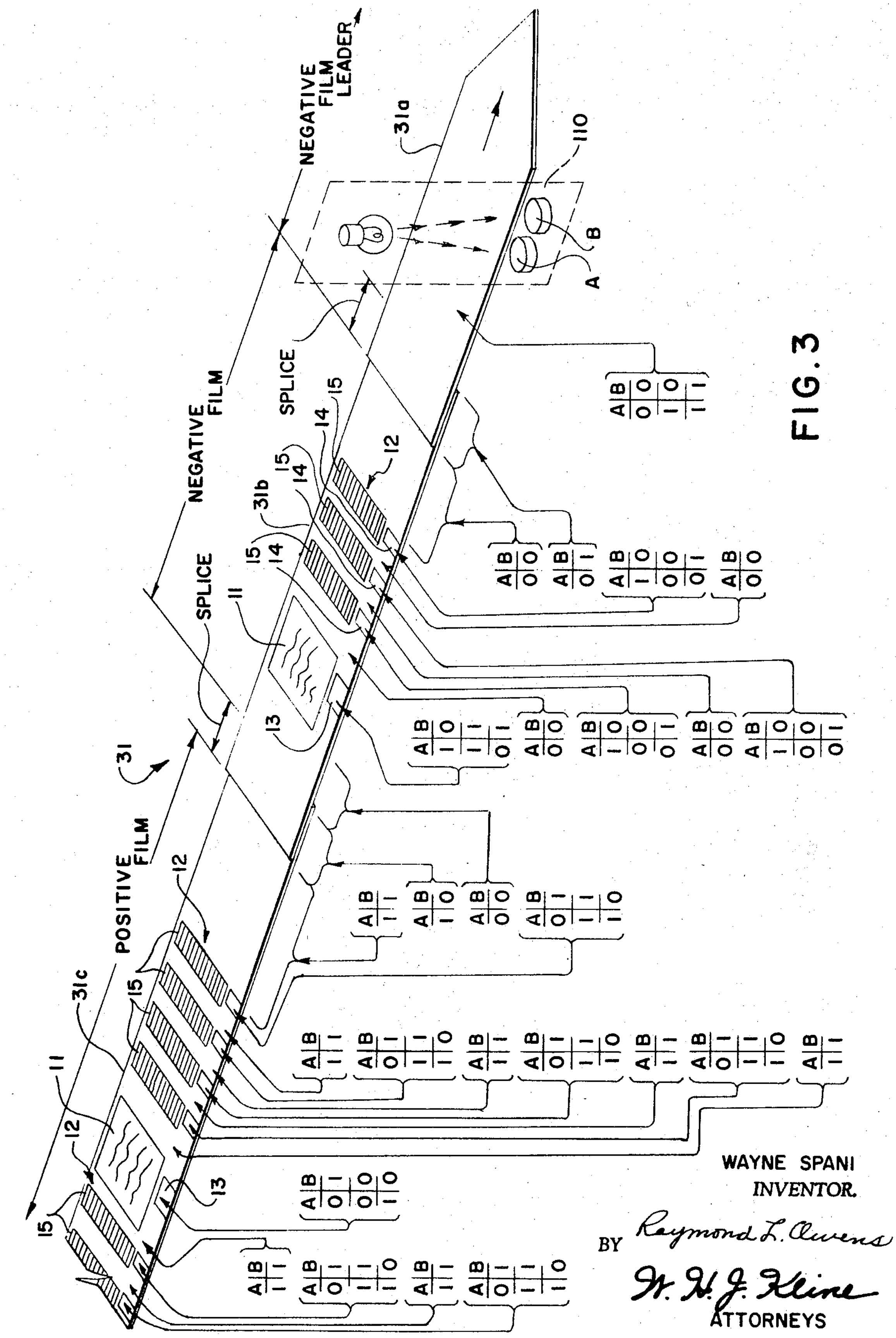
FIG. 3 shows a section of a typical strip of microfilm to be searched by the reader system shown in FIG. 1, and logical truth tables for the photosensitive devices A and B in the reader station which are adapted to decode the timing marks and document marks on the film strip.

To facilitate an understanding of the present invention, reference is first made to FIG. 3 which shows a typical section of a strip of microfilm 31 which may be used in a microfilm reader system in accordance with the invention. The film strip 31 comprises a high contrast leader portion 31*a*, a negative film portion 31*b*, and a positive film portion 31*c*. For purposes of this disclosure the term negative image will mean that the film contains a reverse-tone image of the original scene, whereas the term positive image will be taken as the opposite of negative and mean an image with the same toner relationships as those in the original scene. The filmstrip 31 further includes a plurality of information or document images 11, each of which is identified by a retrieval code field 12. The retrieval code field 12 is comprised of one or more column words 15 comprised of a predetermined number of data bits. Each bit in each column word 15 is in the form of an opaque or a transparent rectangular area. For purposes of illustration, a column word 15 is shown as having fourteen bit positions, twelve corresponding to three decimal numbers, a utility bit and a parity checking bit. Three column words 15 are shown in the code field 12 associated with the image 11 in the negative portion 31*b* and four column words are shown in the code field 12 associated with the image 11 in the positive film portion 31*c*. However, it should be understood that more or less columns may be used as they are needed to identify a particular document image. Further, the information pertinent to a particular search may be recorded in any one of the columns preceding the document image, and apparatus in accordance with the present invention will be adaptable to detect that particular data and retrieve the document image.

Adjacent to each document image 11 is a document image position mark or indicium (DM)13 and adjacent to each column word of a code field is a column image position mark or indicium 14, sometimes referred to herein as a timing mark (TM). FIG. 3 also shows in schematic block form a reading station 110 which includes a first photocell A and a second photocell B. Photocells A and B are each adapted to decode both timing marks (TM) and document image marks (DM) by selectively detecting various bits of information in accordance with the light transmission capability of the filmstrip 31. FIG. 3 further shows truth tables of the various states that the photocells A and B will assume as the filmstrip 31 advances by them which will be discussed more fully hereinafter.

The spacing and size of the two photocells are an important feature of this system. Basically, two conditions must be met in proportioning the space and size of the sensors: (1) a timing marks' width must be less than the distance between the photocells and; (2) a document mark must completely cover both photocells.

Referring now to FIG. 1, there is shown the general organization of a microfilm reading system 10 in accordance with the invention which includes a reader 20 having a plurality of code word detecting photocells (not shown) in the reader station 110 which decode the bits of data in each bit position of each column word. The reader 20 further includes apparatus for converting the bits of each of the column words into sets of electrical signals for use by the system 10 and a film moving mechanism (disclosed in detail in connection with FIG. 2) for moving the microfilm in either a forward or reverse direction or for stopping the film. The reader 20 still further includes means for projecting particular document images having a predetermined associated code field onto a viewing screen where it can be viewed by a user. A copier machine may also be provided to permit a user to make a copy of a recovered or retrieved document image. Although the foregoing described reader 20 may take various forms known in the art, the film reader apparatus disclosed in commonly assigned U. S. Pat. No. 3,290,987 entitled, AUTOMATIC SEARCHING FILM READER in the name of James et al. is especially suitable for use with apparatus in accordance with the present invention.

The system 10 further includes a memory unit 24 having memory storage 24*a* which stores data received from a keyboard 26 and which under the control of a memory control unit 40, causes a column address selector 24*b* to transfer a column word held in storage 24*a* to a digital comparator 27 for comparison with a decoded film column word transferred to it from interface logic 28. Memory units comprised of memory storage and column address selectors may take various forms known in the art, some of which are commercially available. As will be understood by those skilled in the art, the memory storage 24*A* could also be formed from bi-polar, quadlatch devices such as Model SN 7475N manufactured by the Texas Instruments Inc. The column selector 24*b* could also be provided by commercially available integrated (MSI) TTL counters.

The keyboard 26 includes a series of buttons which permit a user to enter column words into the storage 24*a*. When writing into the storage 24*a* from the keyboard 26, each digit is automatically placed in the next lower significant position. Further, the keyboard 26 provides an input search signal to a control unit 44 to commence the search and an input refile or end the search signal if a user should so choose. Although not shown, the keyboard 26 may include apparatus which permits selective editing of the stored column words. Commercially available keyboards permit this function by using skip and reset buttons. A typical keyboard which may be used in accordance with the present invention is shown in FIG. 1 of the aforesaid U. S. Pat. No. 3,290,987. The contents of the memory unit 24 are continuously monitored and displayed in a visual display 29.

The digital comparator 27 is adapted to compare each decoded film column word with each column word which had been entered into the storage unit 24*a* from the keyboard 26 and sequentially provide signals to the comparison logic 30 over two lines labeled X and Y, in accordance with the logic of Truth Table I. The comparator may take various forms known in the art, some of which are commercially available such as Model DM 8200 manufactured by National Semiconductor Corporation of Santa Clara, California.

TABLE I

| X Y | Comparisons of Decoded Column Word with Memory Word |
|---|---|
| 1 1 | = |
| 1 0 | > |
| 0 1 | < |

Logic 30 also receives programming data from a manual programmer 32 which may be provided by thumb wheel type switches disposed on the keyboard 26 and signals through leads 310 (*a–b*) from the address selector 24*b*, described more fully hereinafter. The comparison logic 30 permits a comparison of a decoded film column word with a selected number of combinations of stored column words. When a code field entered in the keyboard 26 has been decoded on film and six satisfaction signals (Sat. 1–6) are produced, an AND gate 34 hereinafter referred to as a hit decoder, will produce and send an input signal back to the reader 20 and a logic control unit 44. The reader 20 causes the film moving mechanism to correctly position the decoded document image for viewing by the reader 20.

Figure 2:
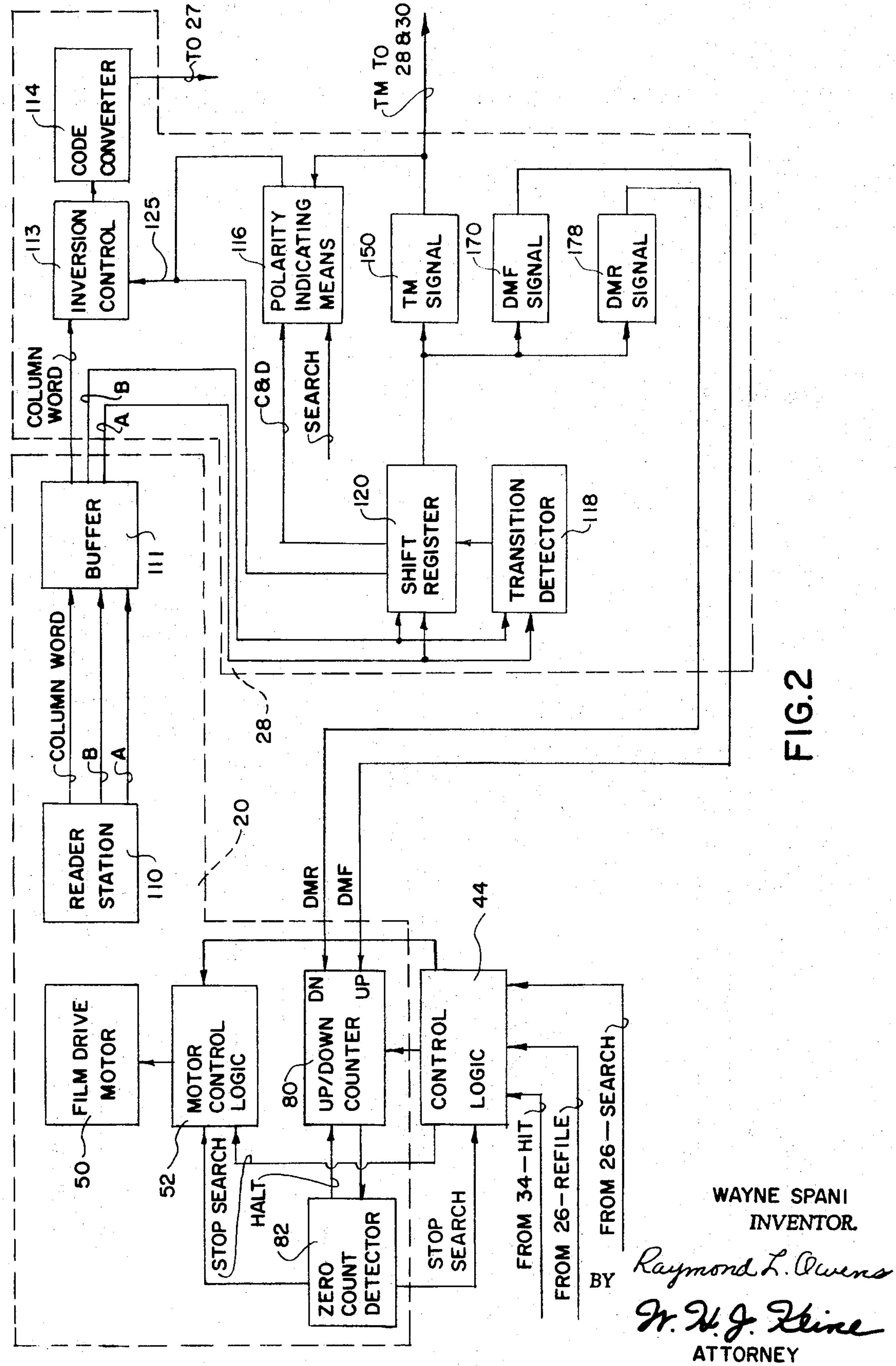
FIG. 2 is a block diagram in more detail than FIG. 1 showing in more detail the reader and interface logic blocks shown in FIG. 1.

Turning now to FIG. 2, the reader 20 includes a bidirectional film drive motor 50, motor control logic 52 which is adapted to drive the motor 50 to move the film in a forward direction, in a reverse direction, or halt film movement, an up-down counter 80 and a zero-count detector 82 adapted to monitor the counter 80. Motor control logic circuit 52 may take various forms known in the art some of which are commerically available such as that disclosed in U. S. Pat. No. 3,437,842. Up-down counters are also commercially available from a number of sources, such as a counter model SN 74193N manufactured by the Texas Instruments Inc.

In operation, when a keyboard search button is depressed, a search mode signal is applied to the logic 44 which in turn provides an energizing pulse to the motor control logic 52 which causes the film drive motor 50 to operate in a forward direction. At this time, the reading station 110 which includes the aforementioned plurality of photocells for reading the words of each column (and the photocells A and B shown in FIG. 3), provide electrical signals representative of a recorded film column word to a buffer storage unit 111 which is coupled to the interface logic 28. Searching of the microfilm takes place while the film is moving at a maximum rate in a forward direction. When a code field is decoded which satisfies the conditions entered into the keyboard 26 and the programmer 32 hereinafter described, the hit decoder 34 (see FIG. 1) produces a hit signal which is received by the control logic 44 which now provides an energizing pulse to the up-down counter 80. Each time a document mark forward (DMF) is preceded by apparatus 170, it is received by the counter 80, which adds a count of 1 to the number stored in the counter 80. At the same time the motor control logic circuitry 52 in response to a stop search signal from the control logic 44 slows the operation of the film drive motor 50 until it stops or halts. At this time, the motor control logic 52 also sends a count-down signal to the counter 80 which thereafter in response to document mark reverse signals (DMR) produced by an apparatus 178 causes the counter 80 to count down a number until a time is reached when the zero detector 82 decodes a 0 count in the counter 80. The detector 82 then sends a halt signal to the motor control logic 52 which halts the operation of the film drive motor at which time the image of the identified docket will be correctly positioned in a projection station.

The search will again be commenced upon a user depressing the search button in the keyboard 26 which sends a search signal to the control logic 44 which in turn energizes the motor control logic 52. If the user should desire to end a search he will depress a refile button on the keyboard 26 which energizes a refile line which provides an input signal to the control logic 44. In turn, the control logic 44 energizes the motor control logic causing it to reverse the film drive motor 50 until the film is completely rewound into a storage magazine.

The buffer 111 delivers a first set of signals representing a film column word to inversion control circuitry 113 and signals from the photocells A and B to a shift register 120 and a transition detector 118. The inversion control circuits 113 in response to a control signal from polarity indicating means 116 indicating that the film is of a positive polarity inverts the code word signal levels in conversion control logic 13 so that a code converter 114 will see a second set of signals having levels which appear to it to be produced by negative film. The code converter 114 which may be provided by a plurality of Excess 3 to BCD Converters such as described in commonly assigned U. S Pat. application, Ser. No. 124,684 filed Mar. 12, 1971 entitled, "EXCESS 3 TO BCD CONVERTER" to Wayne Spani.

The transition detector 118 detects a change in the state of one of the photocells A and B and provides a signal to the shift register 120 which permits it to update its stored information. The polarity indicating apparatus 116 and timing mark apparatus 150, document forward mark apparatus 170 and document reverse mark apparatus 178 all are coupled to and monitor the shift register 120 to provide their requisite output signals in a manner which will be described more fully hereinafter.

Returning to FIG. 3 where a plurality of truth tables for the outputs of the photocells A and B are shown. For these truth tables, when either photocell A or B is covered by a high contrast portion of the film this condition is defined as logical 1 whereas if it is covered by a low contrast portion it is defined as logical 0. As the high contrast leader portion 31*a* of the film strip 31 (see FIG. 3) advances past the photocells A and B of the reader station 110, both photocells are first covered (logic condition 0,0), thereafter the leader 31*a* covers photocell A which changes to logical 1, while photocell B is still uncovered and at logical 0. The leader finally moves to a position where both photocells are covered, and have a logical 1 output. When a negative film timing mark image moves past the photocells, its width is such that the photocells A and B produce respectively the sequence 10,00,01 whereas if a positive film timing mark image moves past the reader station 110, the sequences will be 01,11,10, the negative complement of the situation wherein a negative film timing mark image moves past the reader station 110.

Figure 4A:
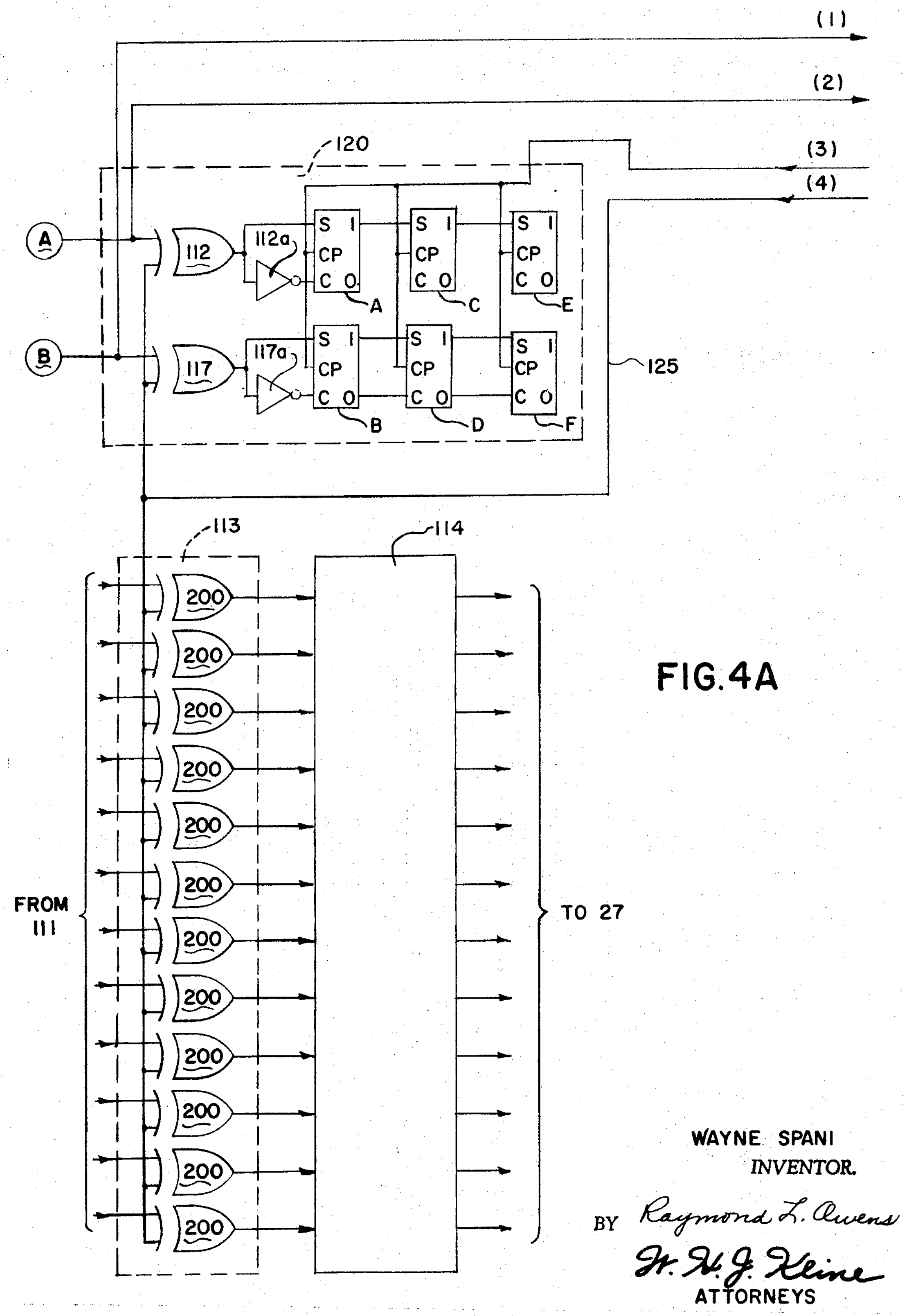
FIGS. 4A and 4B, when aligned, show a detailed block diagram of the interface logic block 28 shown in FIG. 2.
Figure 4B:
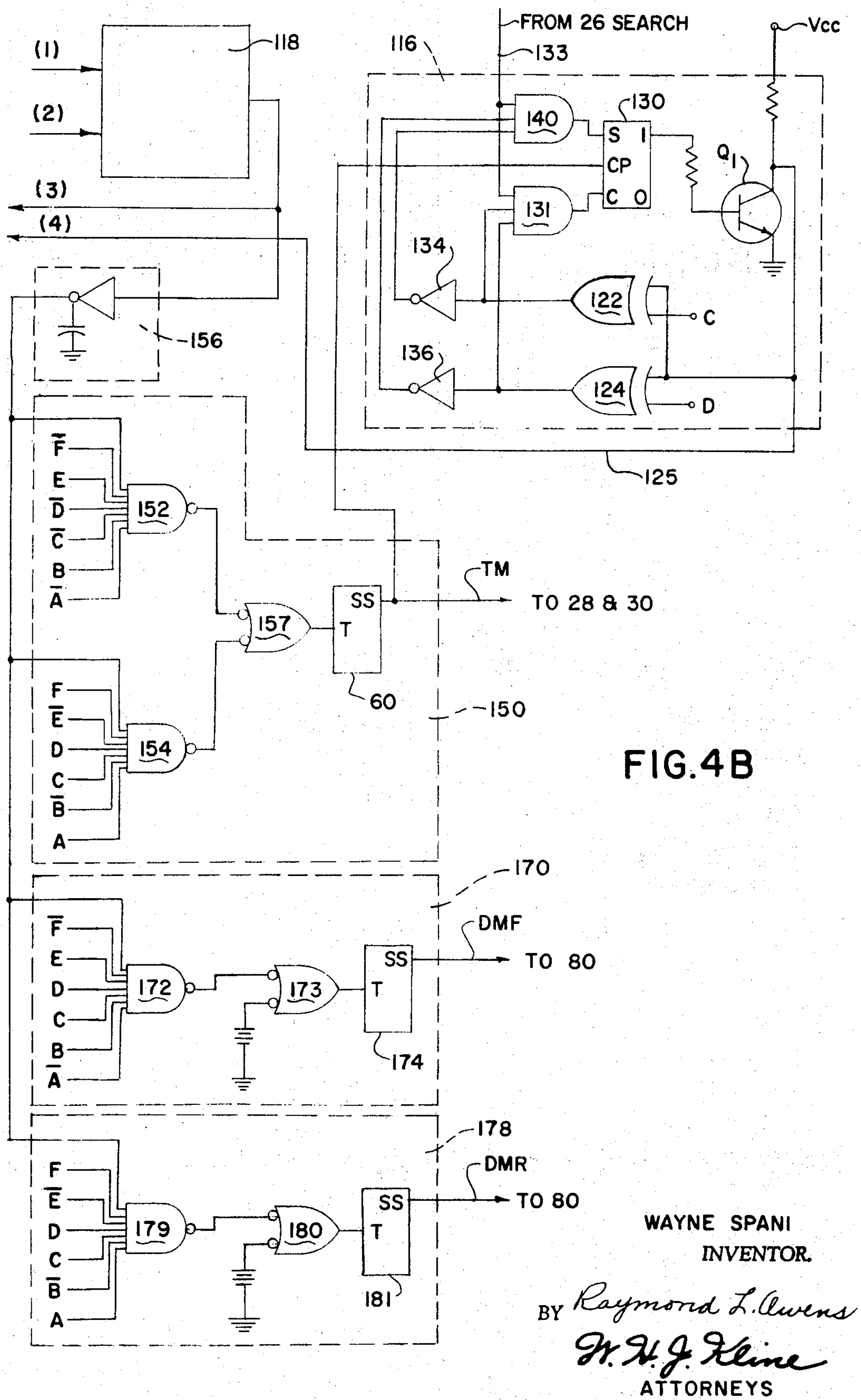

Turning now to FIGS. 4*a* and 4*b*, which to facilitate reading, should be positioned so that the leads labeled 1, 2, 3, 4 on FIG. 4*a* and FIG. 4*b* are aligned. The photocells A and B each respectively provide input signals to exclusive OR gates 112 and 117. The other input to each of these gates is provided by a (F/F) line 125 from the polarity indicating means 116. Exclusive OR gate 112 provides an input to the set input of flip-flop A and a signal by way of inverter 112*a* to the clear input of the F/F A. Similarly, gate 117 provides an input to the set input of F/F B and a signal inverted by inverter 117*a* to the clear input of F/F B. When negative polarity film is read, the polarity indicating means 116 input signal level to the exclusive OR gate 112 and 117 will be low, whereas if positive polarity film is being read the input to these gates will be high.

The transition detector circuit 118 is shown coupled to the photocells A and B and recognizes a transition in the output signals of one or both of the photocells A and B and applies a high level enabling clock pulse signal (CP) to the flip-flops A, B, C, D, E, and F which comprise the dual three bit shift register 120. The clock pulse signal permits the shifting of data through the shift register 120. The transition detector circuit 118 may be provided by a single shot type device which produces an output pulse of limited time duration each time there is a change in either or both of the inputs from the photocells A and B. In this connection, the circuitry 118 may include a transistor which is gated on by a change in either the output of the photocells A or B to produce a pulse.

In the instance of negative film, just after the timing mark is advanced to a position just beyond photocell B, the following predetermined bit pattern or code will be stored in the shift register 120.

TABLE II

| | | | |
|---|---|---|---|
| E | 1 | 0 | F |
| C | 0 | 0 | D |
| A | 0 | 1 | B |

The unique code of Table II indicates that a negative image timing mark has advanced past the reader station 110 is the same code for a negative film timing mark image in the FIG. 3 Truth Tables. Conversely, the following predetermined code or bit pattern (see also FIG. 3) will be stored in the shift register 120 when a positive image timing mark is decoded by the photocells A and B.

TABLE III

| | | | |
|---|---|---|---|
| E | 0 | 1 | F |
| C | 1 | 1 | D |
| A | 1 | 0 | B |

It should be noted that the pattern of a positive film timing mark of Table III is that negative complement (on a bit-by-bit basis) of that for the negative film timing mark shown in Table II. The timing mark signal is also important in the system as shown in FIG. 1 since it enables the memory control 40 to cause the column address selector **24*b* in the memory unit 24 to permit a comparison by the digital comparator 27 of searching. decoded film column word with those film column words stored in memory storage 24*a*.** For convenience of illustration, the disclosed system may store a maximum of six column words.

Timing mark signal producing apparatus 150 includes two NAND gates 152 and 154 which are coupled to time delay and signal level inverting circuitry 156 which receives a high input signal from the transition detector 118. NAND gates 152 and 154 each have their output signals inverted and applied to an OR gate 157 which provides a signal which triggers a single shot (ss) flip-flop 60 adapted to provide an output pulse which is the timing mark signal. The apparatus 150 will produce the timing mark when a timing mark image is decoded and circuitry 156 produces a high level output signal, a predetermined time interval after a transition has been detected. Thus the circuitry 156 inhibits decoding during the transfer of data through the shift register 120 thereby preventing any incorrect decoding of a timing mark. Using a Boolean Algebra notation (see Hill and Peterson, Introduction to Switching Theory Logic Design, 1968), each time a lettered flip-flop in the shift register 120 is in a logic 1 state it will be represented by its letter, whereas if it is in the logic 0 state it will be represented by the letter covered by inversion line. Thus, $\bar{A}$ represents that flip-flop A is in a logical 0 state. The NAND gate 152 is adapted to detect the bit code pattern $\bar{A}B\overline{CD}E\bar{F}$, while NAND gate 154 detects the bit code pattern $A\bar{B}CD\bar{E}F$. Thus, NAND gate 152 is adapted to decode the code pattern or sequence of Table II indicating that a negative film timing mark has advanced past the read station 110 whereas NAND gate 154 is adapted to decode the pattern shown in Table III which indicates that a positive film timing mark has just advanced past the photocells A and B in the reader station 110.

The document mark forward apparatus 170 comprises a NAND gate 172 which in response to the bit pattern $\bar{A}BCDE\bar{F}$ held by the shift register 120 and a high level output provided by the time delay and inverting circuitry 156 produces a low level output signal. The low level output signal of the NAND gate 172 is inverted and provided as an input to an OR gate 173 which in turn provides a trigger pulse to a single shot type flip-flop device 174. The document mark reverse apparatus 178 comprises a NAND gate 179 responsive to the bit code pattern $A\bar{B}CD\bar{E}F$ and a high level signal from the time delay circuitry 156 to provide a low level signal which is inverted and applied to an OR gate 180. The OR gate 180 in turn provides a triggering pulse to a single shot type flip-flop device 181 which in turn provides the DMR pulse signal. As has been previously described, both the DMF and DMR signals are provided to the up-down counter 80 (see FIG. 1) which, after a hit signal has been decoded by the hit decoder 134, will count up each time a DMF signal is received and down each time a DMR signal is received.

It should be noted that each time a relatively large (viz. not a timing mark) contrast area moves past the photocells A and B of the read station 110, the appropriate one of the DMR or DMF signals will be produced, (depending on whether the film is moving in a forward or reverse direction). We shall define a relatively large contrast area as one which can simultaneously cover both the photocells A and B. By means of this arrangement should there be a transition in the filmstrip 31 from negative to positive film, the counter 80 will store a number which will permit the reader to return the given document to a proper position wherein it may be projected onto a viewer screen. More specifically viewing FIG. 3, with negative film, DMF and DMR signals will be produced by the document marks 13. However, when there is a switch to positive film, the DMF and DMR signals will actually be caused by the relatively large contrast area disposed between adjacent timing marks or an adjacent timing mark and document mark. Thus, should there be a transition in the filmstrip between negative and positive image film, the counter 80 will store a number which will permit the reader 20 to return the identified document image to a proper position wherein it may be projected onto a viewer screen.

The polarity indicating means 116 includes two exclusive OR gates 122 and 124 which respectively receive input signals from the logical 1 output side of the flip-flops C and D of the shift register 120. Another input to each of the exclusive OR gates 122 and 124 is provided by the output line 125 of the apparatus 116. As will be explained shortly, as negative film advances past the reader station 110, the output lead line 125 will be low whereas if positive film is being read it will be high. Assuming now that a positive image filmstrip moves past the reader station 110. As is shown in Table III, just after the first timing mark has advanced past the reader station 110 the flip-flops C and D of the shift register 120 will respectively store logical 1 1. At this time, the output line 125 will be in a low signal level condition so that the output of each of the exclusive OR gates 122 and 124 will be high. The polarity indicating means 116 further include AND gates 140 and 131 which respectively provide inputs to the clear and set side of a flip-flop 130. The AND gates 131 and 140 each receive a high level input through a lead 133 from the control logic unit 44 when the reader 20 is in a search mode (viz. before a hit). At this time the AND gate 131 which is also coupled to the outputs of the exclusive OR gates 122 and 124 will provide an enabling input to the flip-flop 130 which will switch it to a logical 0 state thereby removing a signal from the base of a transistor Q1 which turns it off and couples the lead 125 directly to a source of positive potential *Vcc*, thereby raising the output signal level through lead 125 of the apparatus 116 to a high condition or logical 1 state. The exclusive OR gates 122 and 124 are respectively coupled to signal level inverters 134 and 136 which in turn provide input signals to the AND gate 140. Thus in the situation when a negative image timing mark has just advanced past the reader station 110, the flip-flops C and D of the shift register 120 will respectively store 00 (see Table II) and the AND gate 140 will provide an input signal to the set side of the flip-flop 130 causing it to switch to a logical 1 state turning the transistor Q1 on and clamping the signal level applied over lead line 125 to ground, a low level logical 0 state. It should be noted that the pulse TM signal provides a clock pulse to the flip-flop 130 to permit it to change state only during that short time interval when the apparatus 150 has recognized a timing mark at the reader station 110 thereby preventing the false switching of the flip-flop 130.

Figure 5:
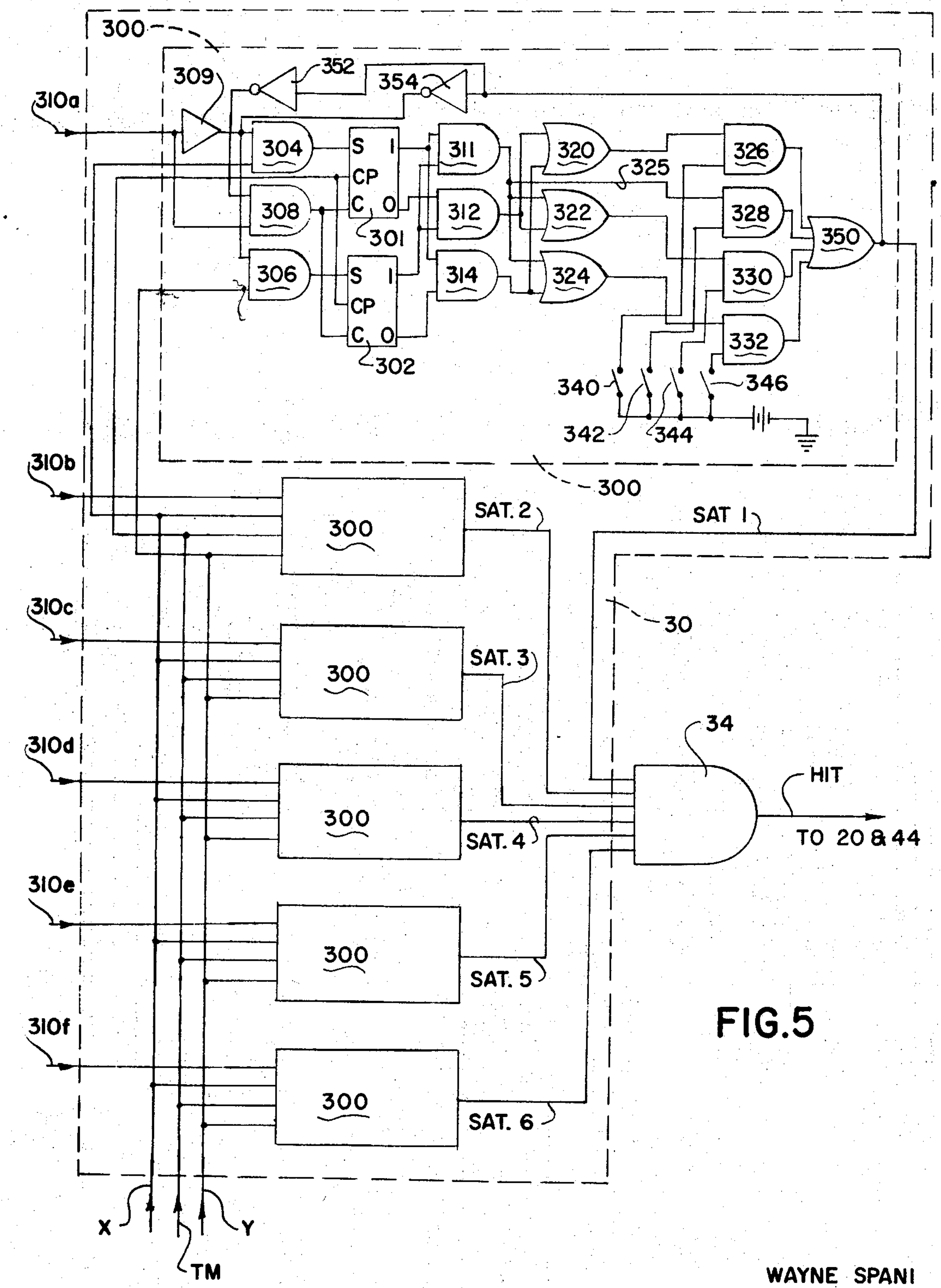
FIG. 5 is a detailed block diagram of the comparison memory logic block 30 shown in FIG. 1.

The polarity indicating means 116 through lead 125 provides input signals to the exclusive OR gates 112 and 114 disposed at the inputs to the shift register 120 and also provides an input to each of a plurality of exclusive OR gates 200 (see FIG. 4*a*) which comprise the inversion control circuitry shown in block 113 shown in block form in FIG. 2. Each of the exclusive OR gates 200 is associated with a photocell in the reader station 110 and is adapted to decode one bit of a film column word. Thus, in the illustrated example there will be 12 exclusive OR gates 200 since we have used for illustration purposes a film column or code word having 12 data bits. When negative film is used, the lead 125 will have a low level condition and if one of the data bit lines is high, the output of its corresponding exclusive OR gate 200 will be high. When the positive film is used and a data line is low the same logical condition as when the data line is high with negative film, the output of the corresponding exclusive OR gate 200 will still be high. Thus, because of the operation of the apparatus 116 the code word signals applied from the code inversion control 113 will always be seen by the code converter 114 as though recorded on negative film. After hit signal is decoded by the hit decoder 34 (FIG. 1), the search signal line to the AND gates 131 and 140 of the polarity indicating apparatus 116 will be de-energized thereby holding the output signal level in line 125 in its last logical state (viz. either high or low). The comparison memory logic 30 is shown in FIG. 5 to be comprised of a plurality of satisfaction logic circuits 300. Each satisfaction logic circuits 300 is associated with a particular column word stored in the storage unit 24*a* shown in FIG. 1 and receives a signal through one of the leads 310 (*a–b*) provided by the column address selector 24*b*. Since each is identical in construction, only the one associated with the first column word in memory is shown in detail and need be described. Circuit 300 include AND gates 304, 306 and 308. The address column selector 24*b* shown in FIG. 1 applies a high level signal over lead 310*a* to the AND gate 308 and an inverter 309 just prior to when the first column in storage 24*a* is to be compared with a decoded film column word in the digital comparator 27. XY signals from the comparator 27 are respectively applied to the AND gate 304 and 306.

Each time the output line 310*a* receives a pulse, a positive going signal is produced by the AND gate 308, in response to the pulse over the lead 310*a* and a normal high output signal produced by inverter gate 352. The logic circuit 300 further includes flip-flops 301 and 302 which may change state only during the presence of the TM signal produced by the apparatus 150 shown in FIG. 5. The AND gate 308 provides an input to the clear side of the flip-flops 301 and 302 which if they are already not in 0 state causes each of them to switch to the 0 state. Shortly thereafter, the timing pulse is produced and the X and Y signals appear at the output of the digital comparator. If there is a high level signal on the X line, then the AND gate 304 will be energized to produce a signal to the set side of flip-flop 301 whereas if the Y line is at a high level the AND gate 306 will produce a high level signal to the set side of the flip-flop 302. Thus, the flip-flop 301 and 302 will now store the information provided over the lines X and Y (see Table I). Three AND gates 311, 312 and 314 are coupled to the output lines of the flip-flops 301 and 302 such that: gate 311 provides an output if the decoded film word is the same as that in memory (=); gate 312 provides an output if the decoded word is columned less than that memory (<); and gate 314 provides an output if the decoded column word is greater than that in memory (>). Three OR gates 320, 322 and 324 are coupled to the AND gates 311, 312 and 314 and respectively provide outputs representative of not equal to ( $\neq$ ), less than or equal to ( $\leq$ ) or greater than or equal to ( $\geq$ ) conditions. Line 325 is directly coupled to the AND gate 311, and thus if it is at a high level represents an equal comparison between a decoded word and that in memory. Logic circuitry 300 still further includes four AND gates 326, 328, 330 and 332 which are respectively coupled to the following mechanical switches: not equal to ( ≠ ) switch 340, equal to switch (=) 342, and less than or equal to switch 344 ( ≤ ), and greater than or equal to switch 346, all of which may be provided by thumb wheel type switches which are embodied in the manual programmer 32 mounted on the keyboard 26. So, for example if the switch 340 is closed, a high level input will be provided to the AND gate 326 which will in turn provide an output if and only if the AND gate 320 produces a high level signal. This situation would indicate that the user is looking for a satisfaction condition when the column word in memory is not equal to the decoder decoded word. In such a case the AND gate 326 produces an output to an OR gate 350 which provides a satisfaction output signal (Sat. 1) to the hit decoder 34 which is also provided as a feedback signal to the inverters 352 and 354 which disables the AND gates 304, 306 and 308 preventing further entry into the flip-flops 301 and 302. Each of the satisfaction logic circuits 300 has a satisfaction output line directly coupled to the hit decoder 34.

Those skilled in the art will appreciate that the manual programmer logic 32 may include further logic which would permit a user to manipulate search requirements by combining the columns in a logical AND OR TIE or blocking modes. Also, though not shown, the system 10 may include further logic which permits a user to selectively compare a film column word with all the memory positions or combinations of columns memory words thereby permitting "opened" or "closed" field searching When the comparison logic 30 resolves that all the pre-program requirements are satisfied for a given code field, the hit decoder 34 produces a hit signal which is fed back to the reader 20 which as previously described causes the document adjacent to the field to be moved into the projection gate and held until an operator commands refile or continues the search by depressing the search button on the keyboard 26.

One important feature of the Comparison Logic is the ability to do "open field" searching. In the logic, this means that while any one film column word is being read, all memory column words are sequentially compared in the comparator and the results are stored in X-Y flip-flops. Thus, a timing mark signal initiates a "burst" of six clock pulses, each of which is used to sequence one of the six memory words and enables the related comparison logic. For example, if the film column word is present on the input data bus for $100\mu s$ and each sequential comparison is allotted $15\mu s$, all six comparisons can be completed in $90\mu s$ well before the onset of the next film column word.

Reviewing the operation of the system 10, a user enters into the keyboard 26 a code field to be searched for which is entered into the memory unit 24. Thereafter, the user depresses a search mode key button on the keyboard and a search of the film is commenced. The interface circuitry 28 provides the functions of providing the necessary timing signals and recognizing whether the film has positive or negative images and further includes circuitry which decodes a film column word and delivers it to a digital comparator 27 which makes a comparison with appropriate selection column word in memory and produces output signals over lines X and Y representing the results of the comparison to comparison memory logic 30. When all of the selected conditions of the search are satisfied, the hit decoder 34, which is coupled to comparison memory logic 30, produces an output which is received by the reader 20. The reader then causes the identified document image to be positioned in a viewing station where it is projected onto a screen for observation by a user.

The invention has been described in detail with particular reference to a preferred embodiment thereof but it will be understood that variations and modifications can be effected within the spirit and scope of the invention.

I claim:

1. In automatic microfilm reader apparatus having means for moving a film having positive and/or negative film type portions, each of such portions having at least one information image, an identifying code field disposed adjacent to each information image, and at least one code field position indicium disposed adjacent to each code field, the apparatus further including means for decoding a code field having predetermined information content which identifies a particular image, the combination comprising:

a. means defining a reader station;
b. means disposed at the reader station for detecting a moving code field position indicium for producing a signal having a first predetermined code pattern in response to a positive film type indicium and a second predetermined code pattern in response to a negative film position type indicium;
c. storage means coupled to said signal producing means for storing said signal;
d. polarity indicating means coupled to said storage means and respectively responsive to said signal for producing a control signal having a magnitude indicative of the polarity of the film type of the film portion at the reader station;
e. means for detecting a recorded film code field and producing a first set of signals representative thereof; and
f. means responsive to said control signal and said first set of signals for producing a second set of record signals representative of the film code field which have a predetermined phase irrespective of whether the polarity of the film portion at the reader station is positive or negative.

2. The invention as set forth in claim 1 wherein said code field position mark reponsive means includes first and second spaced photosensitive devices.

3. The invention as set forth in claim 2 wherein said storage means includes a shift register coupled to said first and second photosensitive devices and adapted to store said first and second predetermined code patterns.

4. For use in automatic film searching apparatus for identifying a particular document or information image from a film having positive and/or negative film type portions, with each such portion having a plurality of document images, and a predetermined identifying code field disposed adjacent to each document image, with each such predetermined code field having a plurality of column words and a column word position mark or indicium disposed adjacent to each column word, the combination comprising:

a. means defining a reader station;
b. spaced first and second photosensitive means disposed at the reader station, each said photosensitive means being adapted to produce signal code patterns in the presence or absence of column position marks respectively, said first and second photosensitive means being adapted to produce a first predetermined signal code pattern in response to a positive film column position mark, and a second predetermined signal code pattern in response to a negative film column position mark;

c. storage means coupled to said first and second photosensitive means for storing said first and second code patterns;

d. means coupled to said storage means and responsive respectively to said first and second predetermined code patterns for producing a polarity indicating signal indicating the film polarity of the type of the film portion at the reader station; and e. means responsive to said polarity indicating signal for decoding a code field having a predetermined information content irrespective of whether it is recorded on a positive or negative film portion at the reader station.

5. The invention as set forth in claim 4 including transition detector means responsive to a change in the signal of one of said photosensitive means to cause said shift register to shift stored code pattern data.

* * * * *